United States Patent
Oh et al.

(10) Patent No.: US 12,322,086 B2
(45) Date of Patent: Jun. 3, 2025

(54) APPARATUS, METHOD AND RECORDING MEDIUM FOR INSPECTING COATING STATE OF OBJECT COATED ON SUBSTRATE

(71) Applicant: KOH YOUNG TECHNOLOGY INC, Seoul (KR)

(72) Inventors: Byung Sun Oh, Siheung-si (KR); Hyeon Geun Park, Seoul (KR)

(73) Assignee: KOH YOUNG TECHNOLOGY INC, Seoul (KR)

( * ) Notice: Subject to any disclaimer, the term of this patent is extended or adjusted under 35 U.S.C. 154(b) by 167 days.

(21) Appl. No.: 18/313,002

(22) Filed: May 5, 2023

(65) Prior Publication Data
US 2023/0368370 A1 Nov. 16, 2023

(30) Foreign Application Priority Data
May 16, 2022 (KR) .......... 10-2022-0059469

(51) Int. Cl.
*G06T 7/00* (2017.01)
*H04N 23/56* (2023.01)

(52) U.S. Cl.
CPC ........... *G06T 7/001* (2013.01); *H04N 23/56* (2023.01); *G06T 2207/10152* (2013.01); *G06T 2207/30108* (2013.01)

(58) Field of Classification Search
CPC ............ G06T 7/00; G06T 2207/10152; G06T 2207/30108; H04N 23/56
See application file for complete search history.

(56) References Cited

U.S. PATENT DOCUMENTS

2011/0002527 A1* 1/2011 Jeong ................ G01B 11/2531
382/141
2018/0278911 A1* 9/2018 Lee ..................... H04N 13/271

FOREIGN PATENT DOCUMENTS

| EP | 1 675 067 | 6/2006 |
| JP | 2007-232552 | 9/2007 |
| JP | 2020-204487 | 12/2020 |

OTHER PUBLICATIONS

Extended European Search Report for European Application No. 23172236.4, dated Oct. 17, 2023.

\* cited by examiner

*Primary Examiner* — Kevin K Pyo
(74) *Attorney, Agent, or Firm* — KILE PARK REED & HOUTTEMAN PLLC

(57) ABSTRACT

An apparatus includes one or more light source groups, a camera; one or more memories configured to store one or more first images acquired in advance, and one or more processors communicatively connected to the one or more light source groups, the camera, and the one or more memories, wherein the one or more processors are configured to acquire a second image by controlling a first light source group among the one or more light source groups and the camera and irradiating light beams to a substrate on which an object is coated, and determine a coating state of the object based on the one or more first images and the second image.

17 Claims, 9 Drawing Sheets

FIG. 2
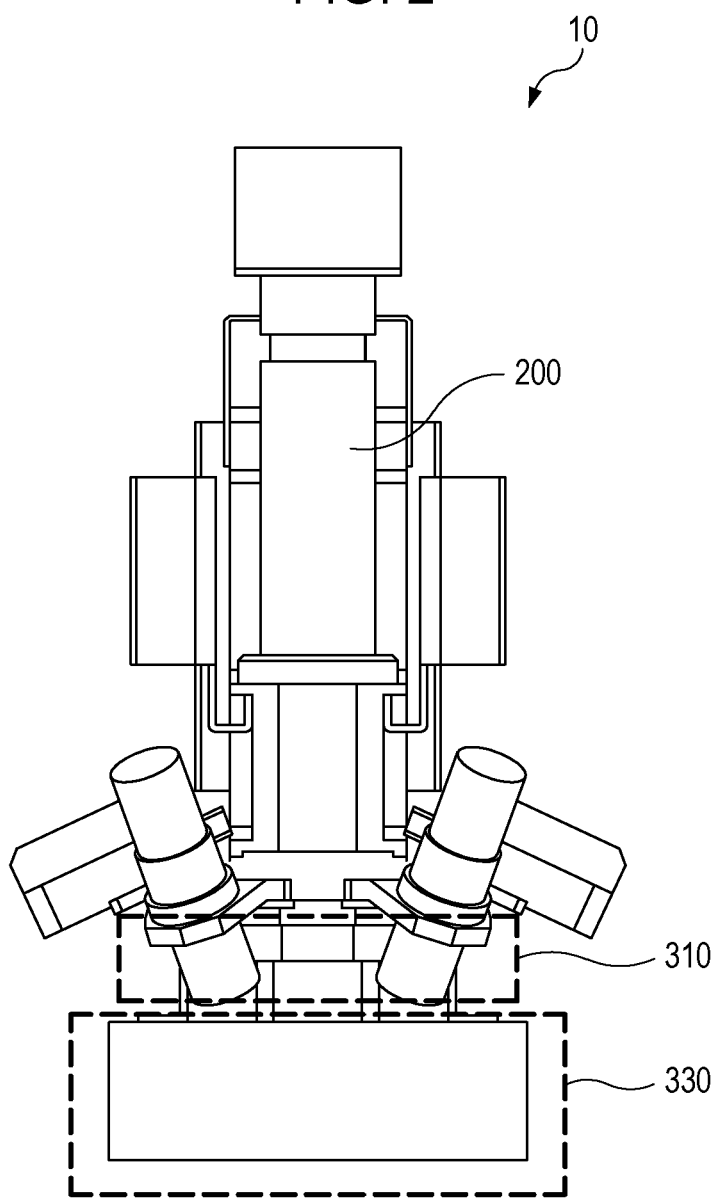
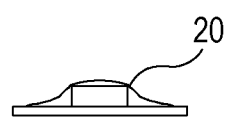

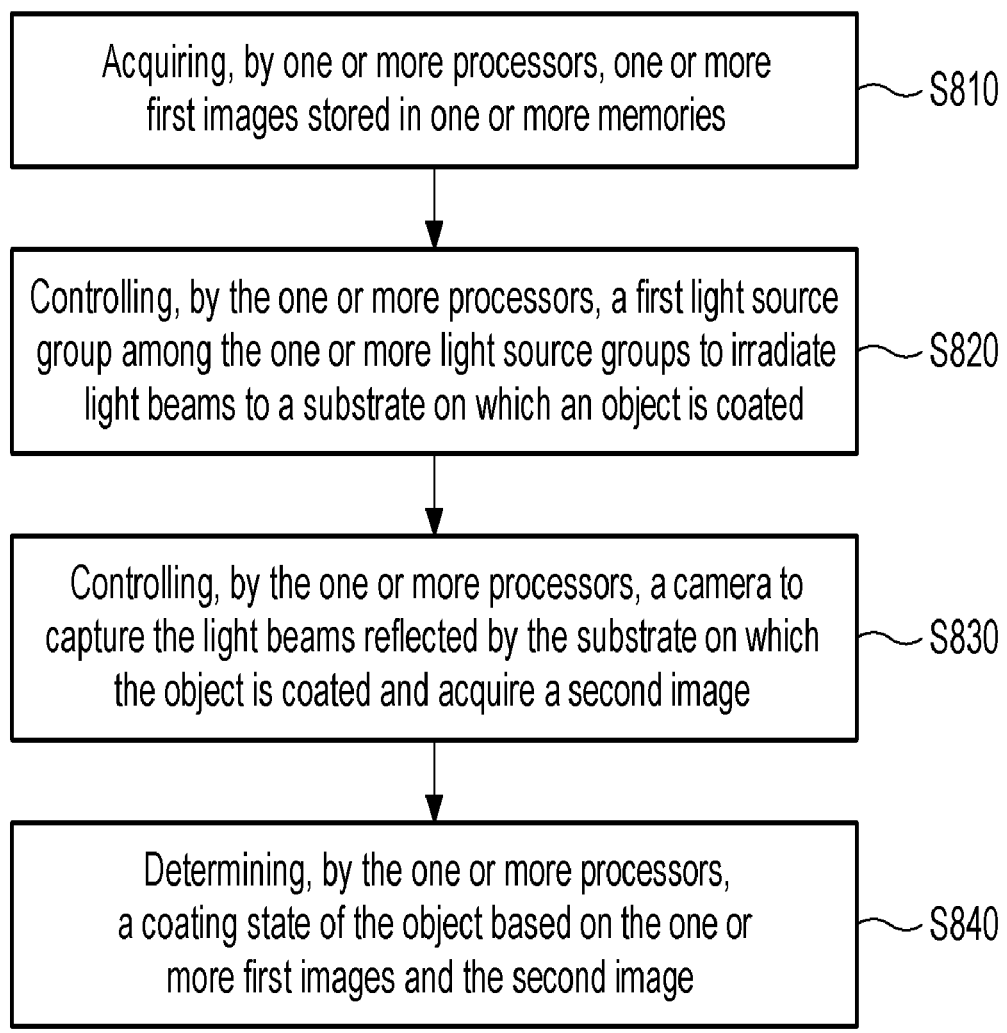

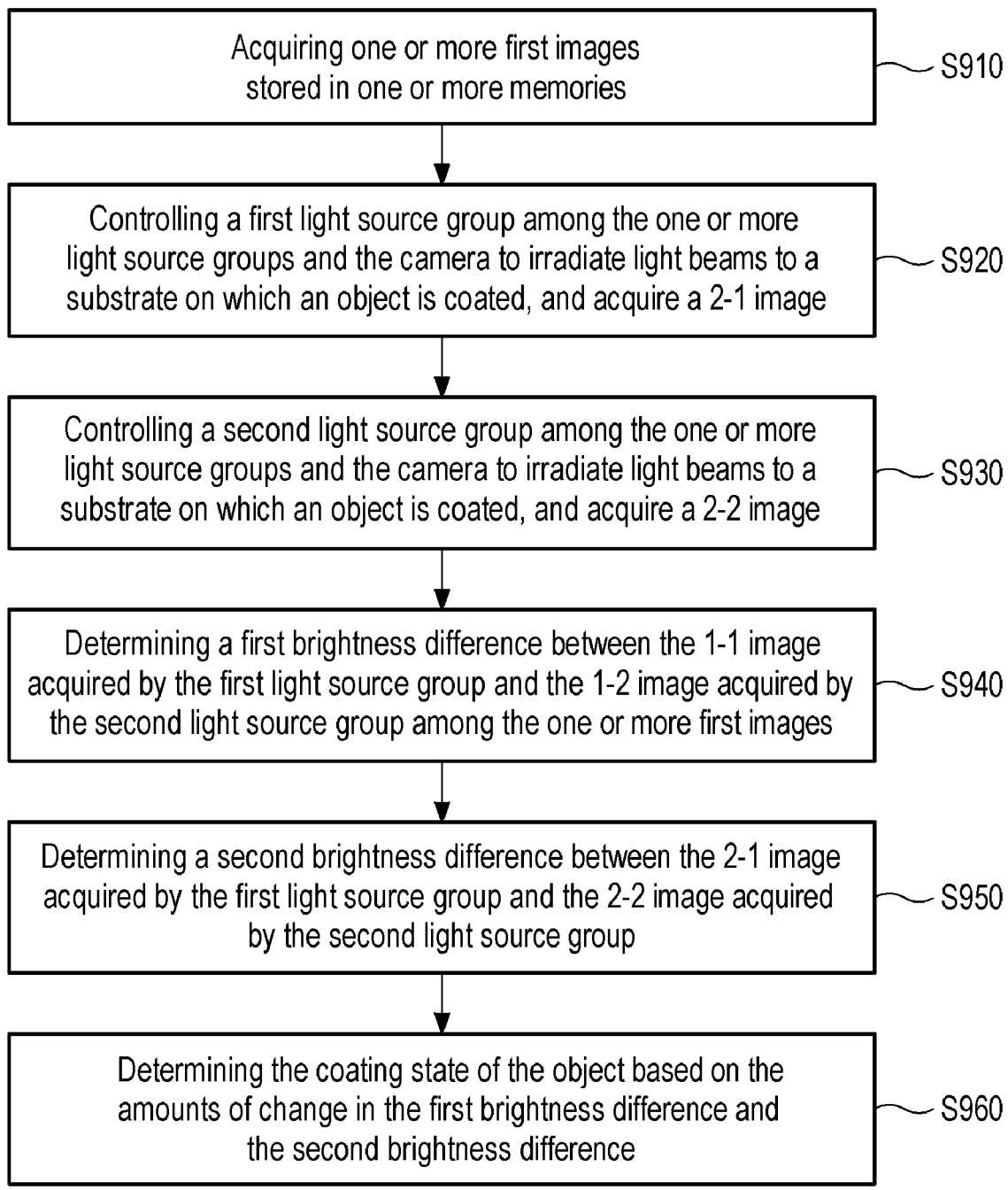

APPARATUS, METHOD AND RECORDING MEDIUM FOR INSPECTING COATING STATE OF OBJECT COATED ON SUBSTRATE

CROSS-REFERENCE TO RELATED APPLICATION

This application is based upon and claims the benefit of priority from Korean Patent Application No. 10-2022-0059469, filed on May 16, 2022, the entire contents of which are incorporated herein by reference.

TECHNICAL FIELD

The present disclosure relates to a technique for inspecting a coating state of an object coated on a substrate.

BACKGROUND

In a substrate processing process, a process of coating an object (e.g., flux), which is a transparent adhesive material, may be performed before mounting a solder-applied package on a substrate. The object such as flux or the like may serve as an adhesive so that the package can be more accurately positioned at a predetermined position on the substrate. Accordingly, when the object is coated at a desired location on the substrate surface, it is difficult to determine whether the object is well coated at a desired location, because the reflection characteristics of the object is changed depending on the type of the substrate or a pad in the substrate.

SUMMARY

Various embodiments of the present disclosure provide a technique for inspecting the coating state of an object coated on a substrate.

An apparatus according to one embodiment of the present disclosure includes: one or more light source groups; a camera; one or more memories configured to store one or more first images acquired in advance; and one or more processors communicatively connected to the one or more light source groups, the camera, and the one or more memories, wherein each of the one or more first images acquired by capturing, with the camera, light beams irradiated from the one or more light source groups and reflected by a substrate on which an object is not coated, and wherein the one or more processors are configured to acquire a second image by controlling a first light source group among the one or more light source groups and the camera and irradiating light beams to the substrate on which the object is coated, and determine a coating state of the object based on the one or more first images and the second image.

In one embodiment, the object may include an adhesive material.

In one embodiment, each of the one or more light source groups may be configured to irradiate light beams to the substrate on which the object is coated, at different predetermined incident angles.

In one embodiment, each of the one or more light source groups may include a plurality of light sources arranged on imaginary concentric circles parallel to the substrate on which the object is coated, and the camera may be disposed vertically above the substrate on which the object is coated.

In one embodiment, each of the one or more light source groups may be configured to irradiate at least one selected from a red light beam, a green light beam, a blue light beam, an ultraviolet light beam, and an infrared light beam to the substrate on which the object is coated.

In one embodiment, the one or more processors may be configured to determine the coating state of the object based on an amount of change in brightness between the first image acquired by the first light source group among the one or more first images and the second image.

In one embodiment, the one or more processors may be configured to: acquire the second image by controlling a second light source group among the one or more light source groups and the camera and irradiating light beams to the substrate on which the object is coated; determine a first brightness difference between the first image acquired by the first light source group and the first image acquired by the second light source group among the one or more first images; determine a second brightness difference between the second image acquired by the first light source group and the second image acquired by the second light source group; and determine the coating state of the object based on the amounts of change in the first brightness difference and the second brightness difference.

In one embodiment, the one or more processors may be configured to detect a boundary surface of the object based on the second image, and determine the coating state of the object based on the boundary surface.

In one embodiment, the one or more processors may be configured to acquire the second image by additionally controlling a second light source group included in the one or more light source groups, and the first light source group and the second light source group may be configured to irradiate light beams having different wavelengths at different incident angles to the substrate on which the object is coated.

A method according to another embodiment of the present disclosure may include: acquiring, by one or more processors, one or more first images stored in one or more memories, each of the one or more first images acquired by capturing, with a camera, light beams irradiated from one or more light source groups and reflected by a substrate on which an object is not coated; controlling, by the one or more processors, a first light source group among the one or more light source groups to irradiate light beams to the substrate on which the object is coated; controlling, by the one or more processors, the camera to capture the light beams reflected by the substrate on which the object is coated and acquire a second image; and determining, by the one or more processors, a coating state of the object based on the one or more first images and the second image.

In one embodiment, the object may include an adhesive material.

In one embodiment, each of the one or more light source groups may be configured to irradiate light beams to the substrate on which the object is coated, at different predetermined incident angles.

In one embodiment, each of the one or more light source groups may include a plurality of light sources arranged on imaginary concentric circles parallel to the substrate on which the object is coated, and the camera may be disposed vertically above the substrate on which the object is coated.

In one embodiment, each of the one or more light source groups may be configured to irradiate at least one selected from a red light beam, a green light beam, a blue light beam, an ultraviolet light beam, and an infrared light beam to the substrate on which the object is coated.

In one embodiment, the method may further include determining, by the one or more processors, the coating state of the object based on the amount of change in brightness between the first image acquired by the first light source group among the one or more first images and the second image.

In one embodiment, the method may further include: controlling, by the one or more processors, a second light source group among the one or more light source groups and the camera to irradiate light beams to the substrate on which the object is coated, and acquire the second image; determining, by the one or more processors, a first brightness difference between the first image acquired by the first light source group and the first image acquired by the second light source group among the one or more first images; determining, by the one or more processors, a second brightness difference between the second image acquired by the first light source group and the second image acquired by the second light source group; and determining, by the one or more processors, the coating state of the object based on the amounts of change in the first brightness difference and the second brightness difference.

In one embodiment, the method may further include: detecting, by the one or more processors, a boundary surface of the object based on the second image; and determining, by the one or more processors, the coating state of the object based on the boundary surface.

In one embodiment, the controlling the camera to capture the light beams reflected by the substrate on which the object is coated and acquire the second image may include additionally controlling, by the one or more processors, a second light source group included in the one or more light source groups, and the first light source group and the second light source group may be configured to irradiate light beams having different wavelengths at different incident angles to the substrate on which the object is coated.

According to another embodiment of the present disclosure, there may be provided a non-transitory computer-readable recording medium that stores instructions to be executed on a computer, the instructions configured to allow, when executed, one or more processors to:

acquire one or more first images stored in one or more memories, each of the one or more first images acquired by capturing, with a camera, light beams irradiated from one or more light source groups and reflected by a substrate on which an object is not coated; control a first light source group among the one or more light source groups and the camera to irradiate light beams to the substrate on which the object is coated, and acquire a second image; and determine a coating state of the object based on the one or more first images and the second image.

According to various embodiments of the present disclosure, the coating state of the object may be accurately determined by using the optical characteristics of the light beam incident on the substrate on which the object is coated.

According to various embodiments of the present disclosure, the coating state of the object may be accurately determined by using a difference in reflection characteristics of the light beams emitted from a plurality of light source groups to the substrate on which the object is coated.

According to various embodiments of the present disclosure, the coating state of the object may be accurately determined by detecting the boundary surface of the object coated on the substrate.

BRIEF DESCRIPTION OF DRAWINGS

The accompanying drawings, which are incorporated in and constitute a part of the specification, illustrate embodiments of the present disclosure.

FIG. 2 is a front view of the inspection apparatus including one or more light source groups according to one embodiment of the present disclosure.

FIG. 8 is a flowchart illustrating an operation of the inspection apparatus according to one embodiment of the present disclosure.

FIG. 9 is a flowchart illustrating an operation of the inspection apparatus according to one embodiment of the present disclosure.

DETAILED DESCRIPTION

Figure 1:
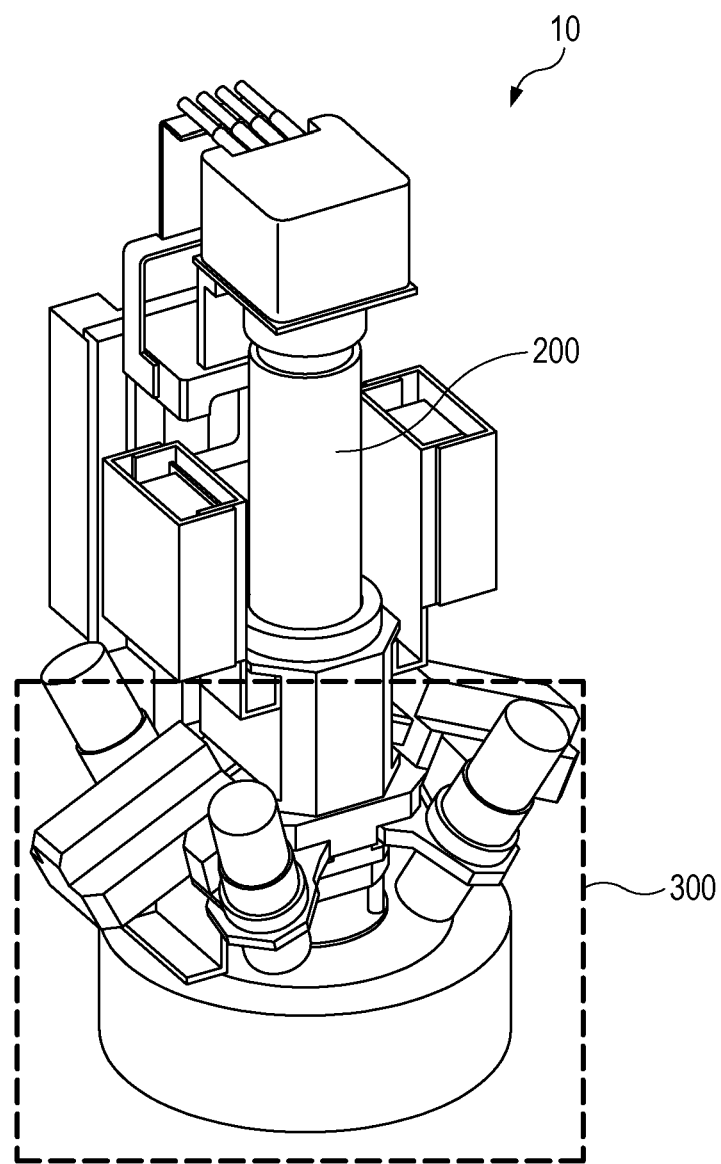
FIG. 1 is a perspective view of an inspection apparatus including one or more light source groups according to one embodiment of the present disclosure.

The various embodiments described herein are exemplified for the purpose of clearly describing the technical idea of the present disclosure, and are not intended to limit the technical idea of the present disclosure to specific embodiments. The technical idea of the present disclosure includes various modifications, equivalents, alternatives of each of the embodiments described in this document, and embodiments selectively combined from all or part of the respective embodiments. In addition, the scope of the technical idea of the present disclosure is not limited to various embodiments or detailed descriptions thereof presented below.

The terms used herein, including technical or scientific terms, may have meanings that are generally understood by a person having ordinary knowledge in the art to which the present disclosure pertains, unless otherwise specified.

As used herein, the expressions such as "include," "may include," "provided with," "may be provided with," "have," and "may have" mean the presence of subject features (e.g., functions, operations, components, etc.) and do not exclude the presence of other additional features. That is, such expressions should be understood as open-ended terms that imply the possibility of including other embodiments.

A singular expression can include meanings of plurality unless otherwise mentioned, and the same is applied to a singular expression stated in the claims.

The terms "first," "second," etc. used herein are used to distinguish one object from another in referring to plural like objects, unless the context indicates otherwise, and are not intended to limit the order or importance of the relevant objects. In one embodiment, the light source groups included in one or more light source groups according to the present disclosure may be distinguished from each other by being expressed as a "first light source group," a "second light source group," and so forth.

As used herein, the expressions such as "A, B and C," "A, B or C," "A, B and/or C," "at least one of A, B and C," "at least one of A, B or C," "at least one of A, B and/or C," "at least one selected from A, B and C," "at least one selected from A, B or C," and "at least one selected from A, B and/or C" may mean each of the listed items or all possible combinations of the listed items. For example, the expression "at least one of A and B" may refer to (1) at least one of A, (2) at least one B, and/or (3) at least one A and at least one B.

The term "part" used herein may refer to software, or hardware components such as a field-programmable gate array (FPGA), an application specific integrated circuit (ASIC) and the like. However, the term "part" is not limited to software and hardware. The term "part" may be configured to be stored in an addressable storage medium or may be configured to execute one or more processors. In one embodiment, the term "part" may include components, such as software components, object-oriented software components, class components, and task components, as well as processors, functions, attributes, procedures, subroutines, segments of program codes, drivers, firmware, micro-codes, circuits, data, databases, data structures, tables, arrays, and variables.

The expression "based on" used herein is used to describe one or more factors that influence a decision, an action of judgment or an operation described in a phrase or sentence including the relevant expression, and this expression does not exclude additional factor influencing the decision, the action of judgment or the operation.

As used herein, the expression that a certain component (e.g., a first component) is "connected" to another component (e.g., a second component) may mean that the certain component is not only connected or coupled to another component directly, but also connected or coupled via a new other component (e.g., a third component).

As used herein, the expression "configured to" may have a meaning such as "set to," "having the ability to," "modified to," "made to," "capable of," or the like depending on the context. The expression is not limited to the meaning of "specially designed for hardware." For example, a processor configured to perform a specific operation may mean a special purpose computer structured through programming so as to perform the specific operation.

Hereinafter, various embodiments of the present disclosure will be described with reference to the accompanying drawings. In the accompanying drawings and the descriptions of the drawings, the same reference numerals may be assigned to the same or substantially equivalent elements. Furthermore, in the following description of various embodiments, the overlapping descriptions of the same or corresponding elements may be omitted. However, this does not mean that the elements are not included in the embodiments.

Figure 5:
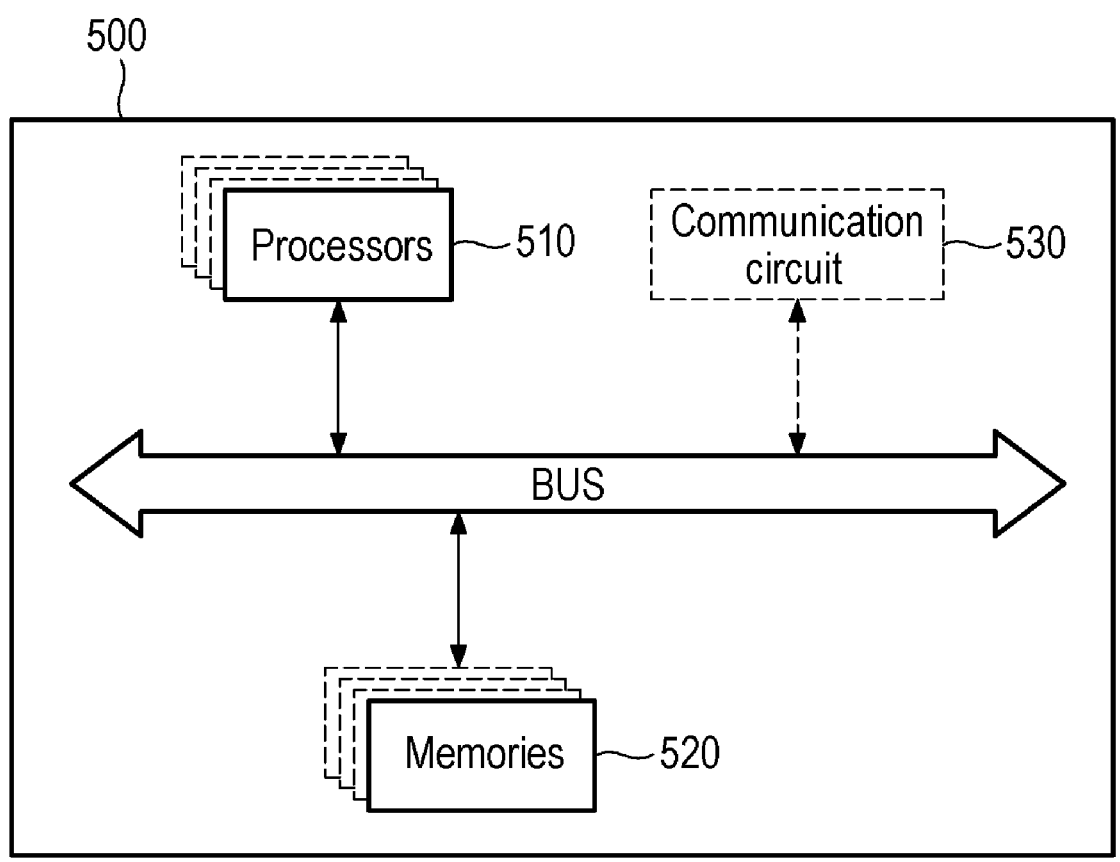
FIG. 5 is a block diagram of a computing device according to one embodiment of the present disclosure.

FIG. 1 is a perspective view of an inspection apparatus including one or more light source groups according to one embodiment of the present disclosure. The inspection apparatus 10 may include one or more light source groups. Reference numeral 300 denotes an exemplary region in which one or more light source groups can be disposed as indicated by a dotted line. The inspection apparatus 10 may be configured to further include a camera 200. Although not shown, the inspection apparatus 10 may be configured to further include one or more processors for performing a predetermined operation and/or one or more memories. In addition, the inspection apparatus 10 illustrated in FIG. 1 may be communicatively connected to a computing device 500 including one or more processors and/or one or more memories, as shown in FIG. 5.

The inspection apparatus 10 according to the present disclosure may be used to perform a substrate processing process. In the present disclosure, the term "substrate" is a plate or container on which devices such as semiconductor chips and the like are mounted, and refers to an object on which the devices can be mounted. The substrate may be used for manufacturing an integrated circuit and may be made of a material such as silicon or the like. For example, the substrate may be a printed circuit board (PCB), and may be called a wafer or the like according to embodiments. In one embodiment of the present disclosure, the substrate may be an electroless nickel immersion gold (ENIG) substrate or an electroless palladium immersion gold (EPIG) substrate. The ENIG substrate or the EPIG substrate may allow solder to be melted and bonded evenly to a plated metal. In one embodiment of the present disclosure, the substrate may be a substrate subjected to an organic solderability preservative (OSP) process. The substrate subjected to an OSP process can minimize the spread of flux due to surface tension and can protect pad surfaces from the external air and moisture.

The substrate processing process of the present disclosure may include one or more processes of coating an object on a substrate. The object may be an adhesive material. As an example, the object may be a flux. The flux is a viscous adhesive material and can fix a solder-applied component to a target position on a substrate until the component is completely bonded to the substrate by solder through a reflow process. The flux may be a transparent material having a property of transmitting light. In the present disclosure, the "transparent material" may refer to a material that completely (i.e., 100%) transmits the irradiated light beam and a material that transmits at least a part of the irradiated light beam. When the object is a flux, the substrate processing process of the present disclosure may include a step of coating the flux on the substrate and a step of mounting a solder-applied part (e.g., a part having a solder-applied lower surface) on a flux-coated pad. Thereafter, the component may be finally coupled to the substrate through a reflow process. As another example, the object may be solder. In this case, the substrate processing process may include a step of printing solder on a substrate and a step of mounting a component on the substrate on which the solder is printed. The components mounted in this process may be finally coupled to the substrate through a reflow process.

FIG. 2 is a front view of the inspection apparatus including one or more light source groups according to one embodiment of the present disclosure. At least one camera 200 may be disposed substantially vertically above the substrate 20 on which the object is coated. As another example, at least one camera 200 may be disposed obliquely at a predetermined angle above the substrate 20 on which the object is coated.

The camera 200 may acquire an image by capturing the light beams emitted from one or more light source groups and reflected by the substrate 20 on which the object is coated. In the present disclosure, each of the light source groups may include one or more light sources for emitting light beams having a preset wavelength. In one embodiment, the respective light source groups may be configured to emit light beams having different wavelengths. Each of the one or more light source groups may be configured to emit at least one selected from a red light beam, a green light beam, a blue light beam, an ultraviolet light beam, and an infrared light beam toward the substrate on which the object is coated. Specifically, the one or more light source groups may include a light source group consisting of light sources for generating a light beam having a wavelength corresponding to red, a light source group consisting of light sources for generating a light beam having a wavelength corresponding to green, a light source group consisting of light sources for generating a light beam having a wavelength corresponding to blue, a light source group consisting of light sources for generating a light beam having a wavelength corresponding to ultraviolet, a light source group consisting of light sources for generating a light beam having a wavelength corresponding to infrared, and the like. Accordingly, the computing device of the inspection apparatus 10 may control each light source group included in one or more light source groups so as to emit light beams having a predetermined specific wavelength. In one embodiment, the respective light sources belonging to one light source group may emit light beams having different wavelengths. Alternatively, the light sources belonging to at least two light source groups may emit light beams having different wavelengths.

Hereinafter, a first embodiment of a configuration of one or more light source groups according to the present disclosure will be described with reference to FIG. 2. In the first embodiment of the configuration of one or more light source groups, the one or more light source groups may include a first light source group 310 and a second light source group 330. Referring to FIG. 2 below, for the sake of convenience of description, it is assumed that the first light source group 310 is disposed higher than the second light source group 330 in the vertical direction from the ground surface. The first light source group 310 may be interchangeably referred to as a top layer, and the second light source group 330 may be interchangeably referred to as a bottom layer. In the first embodiment of the configuration of one or more light source groups, the inspection apparatus 10 may have a plurality of red light sources in the top layer. The respective red light sources may be arranged at equal intervals or at different intervals along the circumferences of (imaginary) concentric circles. In the first embodiment, the inspection apparatus 10 may have an IR light source, a red light source, a green light source, or a blue light source in the bottom layer. The light sources of the bottom layer may be arranged at equal intervals or at different intervals along the circumferences of imaginary concentric circles located below the imaginary concentric circles in which the light sources of the top layer are located. In one embodiment, a plurality of IR light sources may be disposed along the circumferences of (imaginary) concentric circles corresponding to the bottom layer. In one embodiment, a plurality of red light sources, a plurality of green light sources, or a plurality of blue light sources may be disposed along the circumferences of (imaginary) concentric circles corresponding to the bottom layer. The wavelength range of each of the light source groups described above, the number of the light sources included in each of the light source groups, and the like are exemplary and may be changed according to the intent of an implementer.

Figure 3:
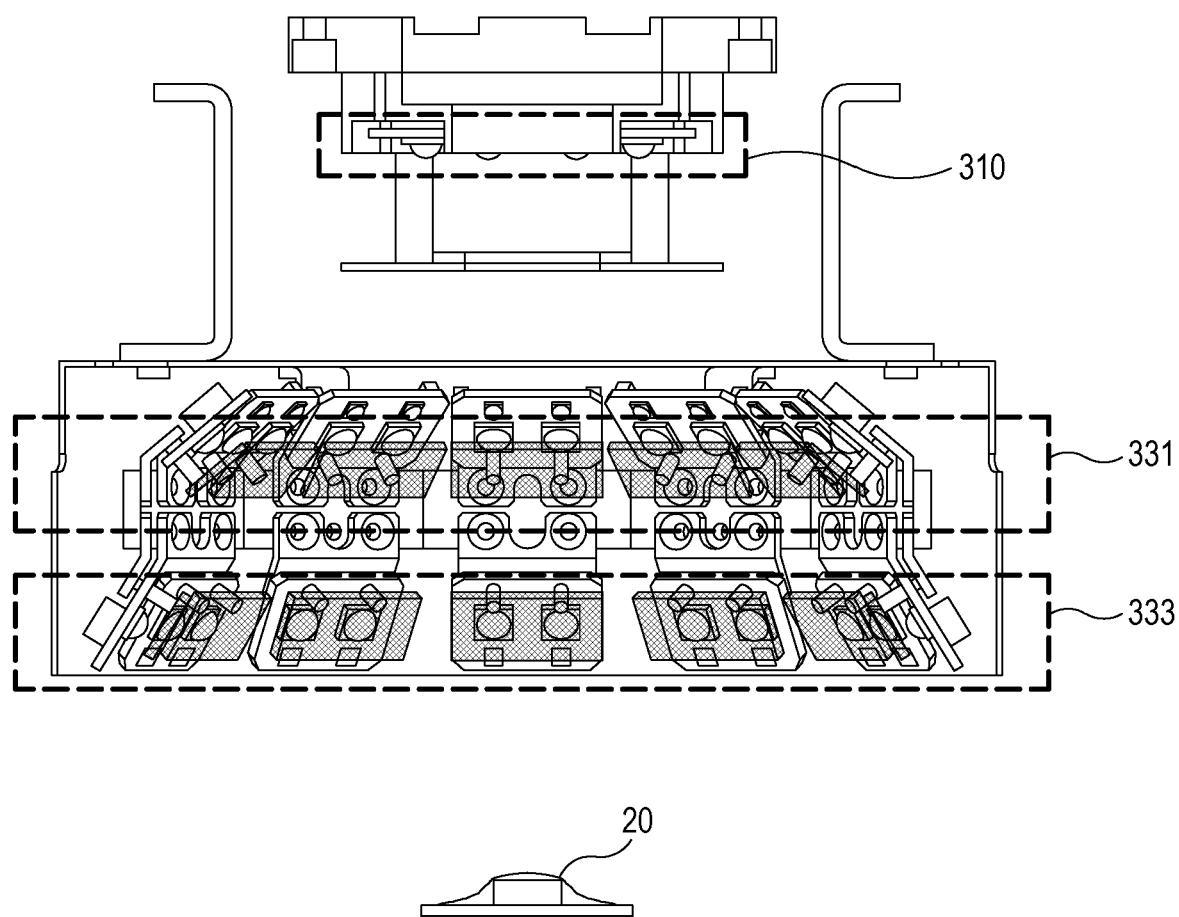
FIG. 3 is an enlarged cross-sectional view of a portion where one or more light source groups are disposed when the inspection apparatus including one or more light source groups according to one embodiment of the present disclosure is cut in a direction perpendicular to a ground surface.

FIG. 3 is an enlarged cross-sectional view of a portion where one or more light source groups are disposed, when the inspection apparatus including one or more light source groups according to one embodiment of the present disclosure is cut in a direction perpendicular to the ground surface. In one embodiment of the present disclosure, the one or more light source groups may be configured to emit light beams toward the substrate on which the object is coated at different predetermined incident angles, respectively.

A second embodiment of a configuration of one or more light source groups according to the present disclosure will be described with reference to FIG. 3. In the second embodiment of the configuration of one or more light source groups, the one or more light source groups may include a first light source group 310, a second light source group 331, and a third light source group 333. Referring to FIG. 3, for the sake of convenience of explanation, it is assumed that the first light source group 310 is disposed higher than the second light source group 331 in the vertical direction from the ground surface, and the second light source group 331 is disposed higher than the third light source group 333 in the vertical direction from the ground surface. Under this assumption, the first light source group 310 may be interchangeably referred to as a top layer, the second light source group 331 may be interchangeably referred to as a middle layer, and the third light source group 333 may be interchangeably referred to as a bottom layer. In the second embodiment of the configuration of one or more light source groups, the inspection apparatus 10 may have a plurality of red light sources in the top layer, and the respective red light sources may be disposed at equal intervals or at different intervals along the circumferences of (imaginary) concentric circles. In addition, the inspection apparatus 10 may include a plurality of ultra violet (UV) light sources, a plurality of red light sources, a plurality of green light sources, or a plurality of blue light sources in the middle layer. The plurality of UV light sources may be arranged at equal intervals or at different intervals along the circumferences of (imaginary) concentric circles. The plurality of red light sources, the plurality of green light sources, or the plurality of blue light sources may be arranged at equal intervals or at different intervals along the circumferences of (imaginary) concentric circles. In addition, the inspection apparatus 10 may include a plurality of IR light sources, a plurality of red light sources, a plurality of green light sources, or a plurality of blue light sources in the bottom layer. The plurality of IR light sources may be arranged at equal intervals or at different intervals along the circumferences of (imaginary) concentric circles. The plurality of red light sources, the plurality of green light sources, or the plurality of blue light sources may be arranged at equal intervals or at different intervals along the circumferences of (imaginary) concentric circles. Further, as an example, the top layer, the middle layer, and the bottom layer may be disposed in the regions upwardly inclined by 1 to 30 degrees, 31 to 50 degrees, and 51 to 89 degrees, respectively, with respect to the vertical central axis.

As described above, at least one light source group among the one or more light source groups of the present disclosure may have a wavelength or irradiation angle of light beams irradiated to an object that is different from other light source groups. The wavelength range of each of the light source groups and the number and angle of the light sources included in each of the light source groups are exemplary and may be changed according to the intent of an implementer. Although the embodiments in which the one or more light source groups include two and three light source groups have been described above with reference to FIGS. 2 to 4, this is merely an exemplary description. It is obvious to those skilled in the art that the one or more light source groups may include N light source groups (where N is a natural number of 2 or more).

Figure 4:
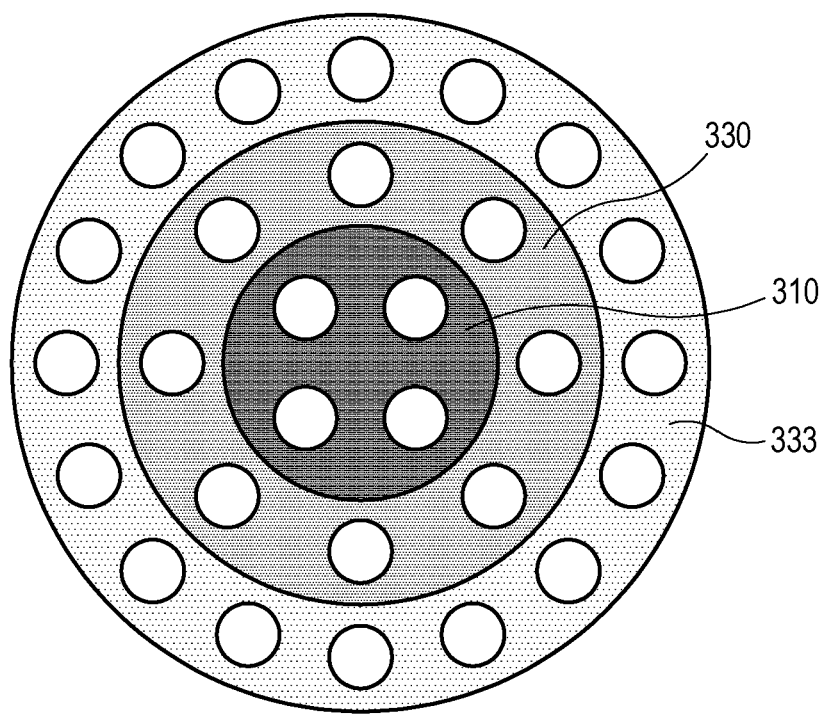
FIG. 4 is an exemplary bottom view of one or more light source groups of the inspection apparatus when the one or more light source groups included in the inspection apparatus according to one embodiment of the present disclosure include three light source groups.

FIG. 4 is an exemplary bottom view of one or more light source groups of the inspection apparatus, when the one or more light source groups included in the inspection apparatus according to one embodiment of the present disclosure include three light source groups. In one embodiment of the present disclosure, each of the one or more light source groups may include a plurality of light sources arranged on imaginary concentric circles parallel to the substrate on which the object is coated. For example, as shown in FIG. 4, the plurality of light sources included in each of the first light source group 310, the second light source group 331, and the third light source group 333 may be arranged at equal intervals along the circumferences of imaginary concentric circles parallel to the substrate on which the object is coated. Although the camera is not shown in FIG. 4, the camera may be disposed vertically above the substrate on which the object is coated. For example, the camera may be located at the center of the first light source group 310, which is the innermost concentric circle. In addition, at least one camera may be disposed at a position tilted at a certain angle vertically above the substrate on which the object is coated. For example, at least one camera may be located outside the first light source group 310, which is the innermost concentric circle.

FIG. 5 is a block diagram of the computing device 500 according to one embodiment of the present disclosure. In the present disclosure, the computing device 500 may be included in the inspection apparatus 10 or may be independent from the inspection apparatus 10. According to one embodiment of the present disclosure, the computing device 500 may include one or more processors 510 and/or one or more memories 520 as components. In some embodiments, at least one of these components of the computing device 500 may be omitted, or other components may be added to the computing device 500. In some embodiments, additionally or alternatively, some components may be integrated, or may be realized as a single entity or multiple entities. In the present disclosure, one or more processors 510 may be referred to as a processor 510. The term "processor 510" may mean a set of one or more processors, unless the context clearly dictates otherwise. In the present disclosure, one or more memories 520 may be referred to as a memory 520. The term "memory 520" may mean a set of one or more memories, unless the context clearly indicates otherwise. At least some of the internal and external components of the computing device 500 may be connected to each other through a bus, a general purpose input/output (GPIO) device, a serial peripheral interface (SPI), or a mobile industry processor interface (MIPI) to send and receive data and/or signals.

The processor 510 according to one embodiment of the present disclosure may control at least one component of the computing device 500 and the inspection apparatus 10 connected to the processor 510 by driving software (e.g., instructions, programs, etc.). For example, the processor 510 may control one or more light source groups, cameras, or one or more memories connected to the processor 510 by driving software (e.g., instructions, programs, etc.). In addition, the processor 510 may perform operations such as various calculations, processes, data generation, and processing related to the present disclosure. Moreover, the processor 510 may load data or the like from the memory 520 or store data in the memory 520. In the present disclosure, the components of the inspection apparatus 10 are controlled by the processor 510 unless otherwise indicated in the context.

The memory 520 according to one embodiment of the present disclosure may store various data. The data stored in the memory 520 may be data acquired, processed, or used by at least one component of the computing device 500 and may include software (e.g., commands, programs, etc.). The memory 520 may include a volatile and/or non-volatile memory. In the present disclosure, commands or programs are software stored in the memory 520, and may include an operating system for controlling resources of the computing device 500, an application, and/or middleware for providing various functions to an application so that the application can utilize the resources of the computing device 500. In one embodiment, the memory 520 may store instructions that, when executed by the processor 510, cause the processor 510 to perform an operation.

The memory 520 according to one embodiment of the present disclosure may acquire and store one or more first images in advance.

Here, each of the one or more first images may be an image acquired when the camera included in the inspection apparatus 10 captures the light beams irradiated from each of the one or more light source groups included in the inspection apparatus 10 to the substrate on which the object is not coated, and reflected by the substrate. Further, each of the one or more first images may be an image including a region of a metal portion (pad) in the substrate to which a flux is coated. Moreover, each of the one or more first images may be an image converted from Red Green Blue (RGB) values to Hue Saturation Intensity (HSI) values. In addition, each of the one or more first images may be a gray level image. In the present disclosure, a gray level image means an image in which each pixel has a value representing the brightness of the corresponding pixel (i.e., a gray level value).

In order to acquire one or more first images, the one or more light source groups, the cameras, and the one or more memories 520 included in the inspection apparatus 10 may be controlled by the one or more processors 510. The plurality of first images included in the one or more first images may be images acquired based on the light beams emitted from the one or more light source groups.

In one embodiment of the present disclosure, the computing device 500 may further include a communication circuit 530. The communication circuit 530 may perform wireless or wired communication between the computing device 500 and a server, or between the computing device 500 and other apparatuses. For example, the communication circuit 530 may perform wireless communication according to a method such as eMBB (enhanced Mobile Broadband), URLLC (Ultra Reliable Low-Latency Communications), MMTC (Massive Machine Type Communications), LTE (long-term evolution), LTE-A (LTE Advance), UMTS (Universal Mobile Telecommunications System), GSM (Global System for Mobile communications), CDMA (code division multiple access), WCDMA (wideband CDMA), WiBro (Wireless Broadband), WiFi (wireless fidelity), Bluetooth, NFC (near field communication), GPS (Global Positioning System), GNSS (global navigation satellite system) or the like. For example, the communication circuit 530 may perform wired communication according to a method such as USB (Universal Serial Bus), HDMI (High Definition Multimedia Interface), RS-232 (Recommended Standard-232), POTS (Plain Old Telephone Service) or the like. In one embodiment, if the computing device 500 is a separate and independent device from the inspection apparatus 10, the computing device 500 may communicate with the inspection apparatus 10 through the communication circuit 530.

The computing device 500 according to various embodiments of the present disclosure may be various types of devices. For example, the computing device may be a portable communication device, a portable multimedia device, a wearable device, a consumer electronics device, or a combination of these devices. The computing device of the present disclosure is not limited to the above-mentioned devices, and may be a device embedded in the inspection apparatus 10, or a device that controls a plurality of inspection apparatuses 10 in an integrated manner or generally controls an inspection apparatus and a production apparatus for each production line.

Figure 6:
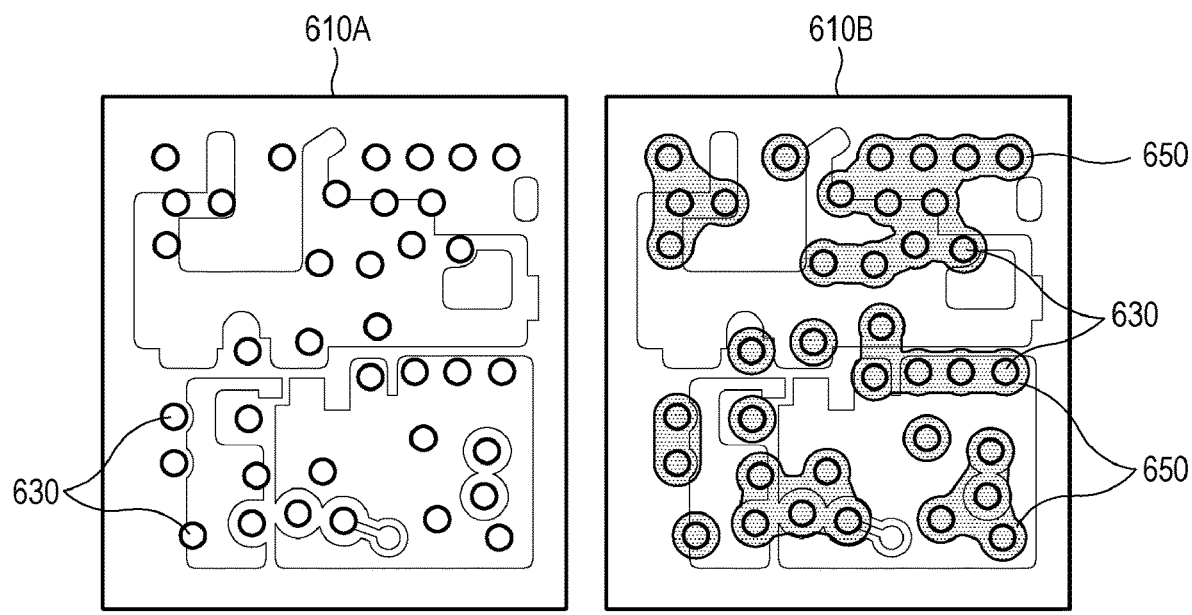
FIG. 6 is an exemplary plan view of a substrate on which an object is not coated and a substrate on which the object is coated, according to one embodiment of the present disclosure.

FIG. 6 is an exemplary plan view of a substrate 610A on which an object is not coated and a substrate 610B on which the object is coated, according to one embodiment of the present disclosure. The substrate 610A on which the object is not coated may include one or more metal portions 630. The metal portions 630 may refer to parts formed of a metallic material such as copper or the like on the surface of the substrate. The substrate 610B on which the object is coated may include one or more metal portions 630. The substrate 610B on which the object is coated may include an object 650 coated on or around the one or more metal portions 630. The substrate processing process of the present disclosure may include a step of determining the coating state of the object 650. In the present disclosure, the step of determining the coating state of the object 650 may include, for example, a step of checking the coating state of the flux coated on the substrate. As used herein, the term "coating state" may refer to a state numerically determined according to a degree of matching between predetermined target coating regions selected prior to coating the object on the substrate and actually coated regions where the object 650 is actually coated on the substrate. The predetermined target coating regions may be, for example, (imaginary) regions separated by a predetermined distance from the boundary lines of the metal portions 630 along the circumference of the one or more metal portions 630. As a result of comparing the target coating regions with the actually coated regions, the coating state may be determined to be "0" if completely mismatched, a value between "0" and "1" corresponding to a matching ratio if partially matched, "1" if completely matched, and a value larger than "1" if the actually coated regions are larger than the target coating regions. Alternatively, the coating state may be determined by percentage based on the target coating regions. The numerical range, etc., which is the basis for determining the above-described coating state, is merely an example for explanation. It will be obvious to those skilled in the art that the coating state can be determined in various ways according to the result of comparison between the target coating regions and the actually coated regions.

In the present disclosure, the term "first image" may refer to an image of the substrate on which the object is not coated. As necessary, the "first image" may be used interchangeably with the expression "1-A image," which may mean the first image acquired based on the A-th light source group among the first images. As an example, it is assumed that a certain first image is acquired by capturing, with the camera, light beams irradiated to the substrate from the light sources included in the first light source group and reflected by the substrate. In this case, the first image may be referred to as a 1-1 image. As another example, it is assumed that a certain first image is acquired by capturing, with the camera, light beams irradiated to the substrate from the light sources included in the second light source group and reflected by the substrate. In this case, the first image may be referred to as a 1-2 image.

In the present disclosure, the term "second image" may refer to an image of the substrate on which the object is coated. As necessary, the "second image" may be used interchangeably with the expression "2-B image," which may mean the second image acquired based on the B-th light source group among the second images. As an example, it is assumed that a certain second image is acquired by capturing, with the camera, light beams irradiated to the substrate from the light sources included in the first light source group and reflected by the substrate. In this case, the second image may be referred to as a 2-1 image. As another example, it is assumed that a certain second image is acquired by capturing, with the camera, light beams irradiated to the substrate from the light sources included in the second light source group and reflected by the substrate. In this case, the second image may be referred to as a 2-2 image. In the present disclosure, the first image and the second image may be simply referred to as "images" according to the context.

Hereinafter, a first embodiment of the present disclosure for determining a coating state of an object will be described. The inspection apparatus 10 may determine the coating state of the object based on the amount of change in brightness between images before and after the object is coated on the substrate. Specifically, the one or more processors included in the inspection apparatus 10 may control the first light source group among the one or more light source groups and the camera to irradiate light beams to the substrate on which the object is coated and acquire a second image (i.e., a 2-1 image), and may determine the coating state of the object based on the amount of change in brightness between the first image (i.e., the 1-1 image) acquired by the first light source group among the one or more first images stored in the memory 520 and the 2-1 image. For example, the inspection apparatus 10 may irradiate light beams through the first light source group and acquire the image (1-1 image) through the camera before the object is coated on the substrate. In addition, the inspection apparatus 10 may coat the object on the substrate, irradiate light beams through the first light source group, and acquire the second image (2-1 image) through the camera. The inspection apparatus 10 may determine the coating state of the object by detecting a change in the brightness between the 1-1 image and the 2-1 image acquired before and after the object is coated on the substrate.

In this case, each of the one or more second images may be an image including regions of metal portions (pads) in the substrate to which a flux is coated. Further, each of the one or more second images may be an image converted from RGB values to HSI values. In addition, each of the one or more second images may be a gray level image.

In one embodiment of the present disclosure, when the first image and the second image acquired before and after coating the object on the substrate are gray level images, the change in brightness between the two images can be determined from a difference in the gray level values for each pixel. When the gray level images are used to inspect the coating state of the object, a predetermined number of first and second images may be selected sequentially from an image pair having the largest difference in gray level values. Specifically, the processor 510 may calculate a difference in gray level values for each matchable pair of the first image and the second image among the plurality of first images acquired for the substrate on which the object is not coated and the plurality of second images acquired for the substrate on which the object is coated, and may select a predetermined number of image pairs in order from an image pair having the largest difference. As the difference in gray level values, for example, contrast may be used. For example, the inspection conditions in the inspection apparatus 10 may be set so that the image pairs to be inspected may be determined in the order in which the difference in gray level values between the first image and the second image is the largest (e.g., at least three image pairs).

In general, if the object is a flux, the boundary is not clearly visible even with the naked eye because the flux is basically transparent. Further, the boundary may not be properly visible due to the reflection characteristics of pads. Moreover, the measured coating state of the flux may be different depending on the coating quality of the substrate, such as ENIG, EPIG, and OSP substrates. On the other hand, if the gray level image is used as in the present disclosure, the difference in gray level values between two images acquired under the same conditions except whether or not the object is coated, may vary depending on a scattering rate of the object coated on the substrate. Accordingly, in the present disclosure, the difference in gray level values can be calculated by acquiring images using at least one same light source group under the same light irradiation situation, that is, before and after coating the object on the substrate, and comparing the acquired images. Thus, in the present disclosure, it is possible to effectively determine the coating or non-coating of the object and the coating state. If the object is a transparent material such as a flux or the like, when the object is coated on a predetermined region of the substrate surface, the reflectance of light beams on the substrate surface may be different from that when the object is not coated or when the object is coated too thick. Therefore, the inspection apparatus 10 for determining the coating state of the object according to the first embodiment of the present disclosure may determine the coating state of the object by comparing the brightness of the images acquired before and after coating the object on the substrate. For example, if the amount of change in brightness at the same location before and after coating the object on the surface of the substrate is equal to or larger than a predetermined threshold value, the object may have been coated on that location and the physical properties related to light reflection may have been changed by more than a predetermined level. Conversely, if the amount of change in brightness at the same location before and after coating the object on the surface of the substrate is less than the predetermined threshold value, the physical properties related to light reflection may not have been changed beyond a certain level because the object is not well coated on that location. Accordingly, the inspection apparatus 10 may determine whether or not the object is well coated on the corresponding region by comparing the amount of change in brightness for each region with the predetermined threshold value. As another example, the inspection apparatus 10 may calculate the amount of change in average brightness value by comparing the average brightness value of the entire surface region of the substrate before coating the object on the substrate with the average brightness value of the entire surface region of the substrate after coating the object on the substrate, and may determine whether or not the object is well coated on the entire surface of the substrate by comparing the amount of change in average brightness values with a predetermined threshold value. In the above-described first embodiment, the first light source group has been described as an example for the sake of convenience, but the type of light source group does not limit the present disclosure. It will be obvious to those skilled in the art that the inspection apparatus of the present disclosure may acquire images before and after coating an object on a substrate under the same light condition by using at least one light source group among the one or more light source groups.

Hereinafter, a second embodiment of the present disclosure for determining the coating state of an object will be described. The inspection apparatus 10 may determine the coating state of the object based on the amount of change in brightness difference calculated for different light source groups before and after coating the object on the substrate. Specifically, the one or more processors 510 included in the inspection apparatus 10 may determine a first brightness difference between the first image (i.e., the 1-1 image) acquired by the first light source group among the one or more first images stored in the memory and the first image (i.e., the 1-2 image) acquired by the second light source group. The one or more processors 510 may control the first light source group among the one or more light source groups and the camera to irradiate light beams on the substrate on which the object is coated to acquire a second image (i.e., a 2-1 image), and may control the second light source group among the one or more light source groups and the camera to irradiate light beams on the substrate on which the object is coated to acquire a second image (i.e., a 2-2 image). The one or more processors 510 may determine a second brightness difference between the 2-1 image and 2-2 image thus acquired. Then, the one or more processors 510 may determine the coating state of the object based on the amount of change in first brightness difference and second brightness difference. For example, the one or more processors 510 may acquire a 1-1 image with the camera by using light beams irradiated from the first light source group and reflected by the surface and may acquire a 1-2 image with the camera by using light beams irradiated from the second light source group and reflected by the surface, before the object is coated on the substrate. Alternatively, the 1-1 image and the 1-2 image may be previously stored in the memory 520 of the inspection apparatus 10. Further, the one or more processors 510 may determine a first brightness difference which is a brightness difference between the 1-1 image and the 1-2 image. The difference in brightness between the two images may be calculated for a predetermined region or for each pixel. For example, when the difference in brightness between the two images is calculated for each pixel, a new image representing the difference in brightness may be generated. Each pixel of the new image may have the same difference in brightness as that of the pixel located at the same position in the 1-1 image and the 1-2 image. In addition, when the difference in brightness between the two images is calculated on the entire image basis, the difference in brightness may be a constant. The constant may be a difference between the average brightness of the 1-1 image and the average brightness of the 1-2 image. Thus, the inspection apparatus may determine a difference in brightness (a first brightness difference) between two images acquired by different light source groups (the first light source group and the second light source group) before the object is coated on the substrate. The one or more processors 510 may determine a second brightness difference which is a difference in brightness between the 2-1 image and the 2-2 image. The process of determining the second brightness difference by the one or more processors 510 is similar to the above-described first brightness difference determination method except that the target image for determining the brightness difference is an image of a substrate on which an object is coated. Thus, the duplicate description is omitted. The one or more processors 510 may determine the coating state of the object by calculating the amount of change between the first brightness difference and the second brightness difference.

If the object such as a flux or the like is coated on a predetermined region of the surface of the substrate, the angle of reflection of incident light beams may be changed before and after coating due to the existence of the coated object or the angle between the surface of the object and the plane of the substrate. As a result, the difference in brightness of the light beams irradiated to the object from the light source groups having different incident angles and reflected toward the camera may be different before and after coating the object. Therefore, the inspection apparatus 10 for determining the coating state of an object according to the second embodiment of the present disclosure may determine the coating state of the object based on the amount of change in brightness difference between the images acquired for different light source groups before and after the object is coated on the substrate. For example, the first brightness difference (difference in brightness between the 1-1 image and the 1-2 image) and the second brightness difference (difference in brightness between the 2-1 image and the 2-2 image) may be calculated from the difference between the brightness values of pixels at the same position in the two images. In other words, the first brightness difference and the second brightness difference may be averages of differences in brightness values of the pixels corresponding to the same position in the two images including a plurality of pixels. The inspection apparatus 10 may calculate the first brightness difference or the second brightness difference by calculating the brightness difference values of the pixels located at the corresponding same position in the two images, and then averaging the brightness difference values. As another example, the first brightness difference (difference in brightness between the 1-1 image and the 1-2 image) and the second brightness difference (difference in brightness between the 2-1 image and the 2-2 image) may be calculated from the difference between the average brightness values of the two images. In other words, the first brightness difference and the second brightness difference may be the difference between the average brightness values of the two images.

In the second embodiment of the present disclosure for determining the coating state of the object, the inspection apparatus 10 may determine the coating state of the object by comparing the amount of change between the first brightness difference and the second brightness difference with a predetermined reference value. For example, it is assumed that the predetermined reference value is 30 and the inspection apparatus 10 determines the coating state of the object to be good when the difference in brightness is changed by more than the predetermined reference value. In this case, when the amount of change in brightness difference calculated by the inspection apparatus 10 before and after coating the object is 40 (>30), the inspection apparatus 10 may determine that the object is well coated on the substrate to satisfy a predetermined criterion. Conversely, when the amount of change in brightness difference before and after coating the object is 20 (<30), the inspection apparatus 10 may determine that the object is not properly coated on the substrate. In the second embodiment for determining the coating state of the object described above, the example regarding the method for calculating the brightness difference or the predetermined reference value is merely an example described for the sake of understanding. The present disclosure includes various methods for calculating a brightness difference and various methods for setting a predetermined reference value. In addition, it will be obvious to those skilled in the art that a plurality of predetermined reference values may be used according to the type of coating state to be determined.

According to the second embodiment of the present disclosure for determining the coating state of an object, the detection performance is enhanced even when an object is coated on an OSP (Organic Solderability Preservative)-treated substrate. Typically, in the case of the OSP-treated substrate, there may be cases where the color of the OSP-treated substrate is changed due to various factors such as heat treatment during the processing of the substrate. In this case, it may be difficult to determine the coating state of the object based on only the amount of change in brightness before and after the coating of the object for the same light source group. However, when the coating state of an object is determined based on the change in brightness difference before and after the coating of the object by using a plurality of light source groups configured to irradiate light beams to the substrate on which the object is coated at different angles of incidence as in the present disclosure, the accuracy of determination can be greatly increased.

The inspection apparatus 10 according to an embodiment of the present disclosure may detect a boundary surface of the object coated on the substrate and may determine the coating state of the object based on the boundary surface. The one or more processors 510 may detect a boundary surface of the object based on the second image. In the present disclosure, the respective light source groups included in the one or more light source groups may form different incident angles with respect to the vertical axis of the substrate plane. Accordingly, when the light beams irradiated from the light source group reaches the camera by being reflected or refracted at the boundary surface of the object, the light source groups from which the light beams are started may be different depending on the slope of the boundary surface. Hereinafter, descriptions will be made in detail with reference to FIG. 7.

Figure 7:
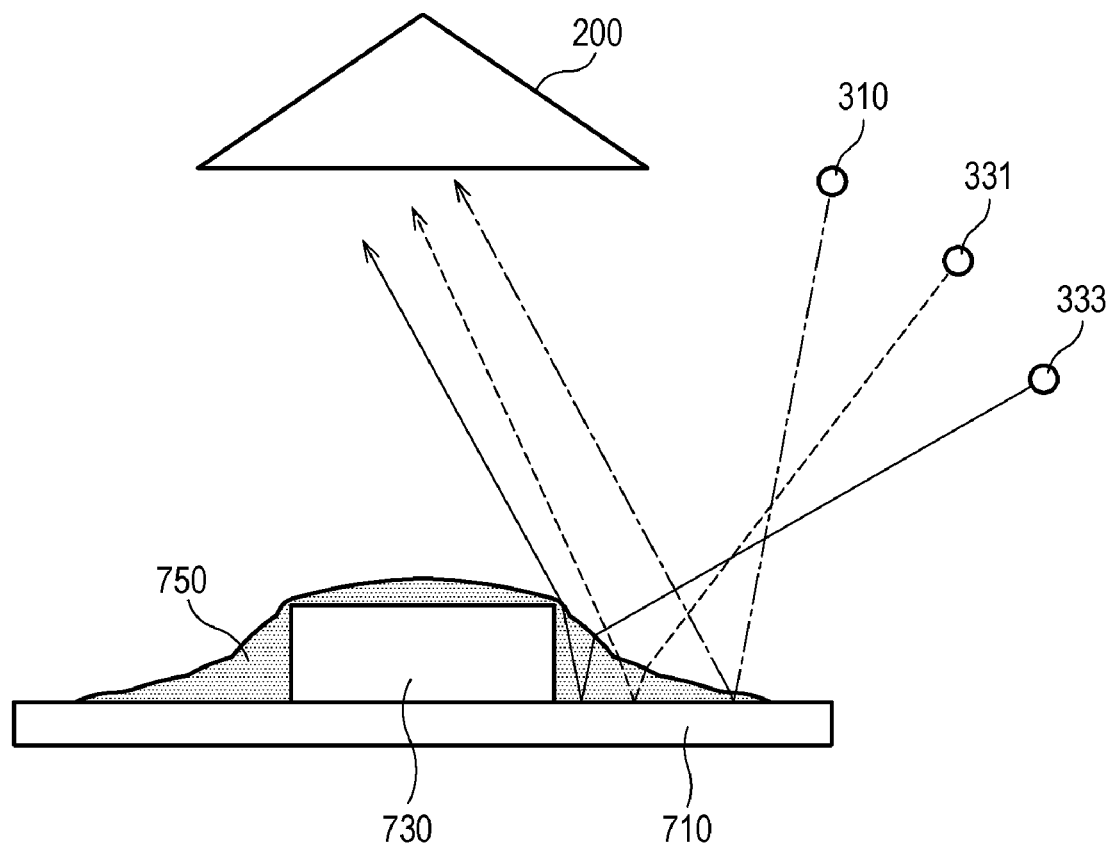
FIG. 7 is a conceptual diagram illustrating a path through which light beams emitted from one or more light source groups according to one embodiment of the present disclosure reach a camera through reflection or refraction on a substrate on which an object is coated.

FIG. 7 is a conceptual diagram illustrating a path through which the light beams emitted from the one or more light source groups according to one embodiment of the present disclosure reach the camera through reflection or refraction on the substrate on which the object is coated. FIG. 7 shows three light source groups as an example. However, the number of light source groups included in the one or more light source groups may be one, two, or more than three. In FIG. 7, the one or more light source groups may include a first light source group 310, a second light source group 331, and a third light source group 333. A metal portion 730 may be disposed on a substrate 710. The upper surface of the metal portion 730 and the periphery of the metal portion 730 existing on the substrate 710 may be coated with an object 750. In this case, the incident angle formed by the light beam incident on the substrate 710 from each light source group with respect to the vertical axis of the substrate 710 increases in the order of the first light source group 310, the second light source group 331, and the third light source group 333. Since the first light source group 310 to the third light source group 333 have different incident angles of light beams with respect to the vertical axis of the substrate plane, specific regions of the object 750 through which the irradiated light beams can enter the camera may be different from each other. In other words, since the incident angles of the light beams of the first light source group 310 to the third light source group 333 are different from each other, the specific regions of the object that can be detected by the camera on the light beam movement path may be different from each other.

The inspection apparatus 10 of the present disclosure may acquire one or more slope regions included in the boundary surface of the object 750 and having a slope within a predetermined range according to the incident angle of each of the one or more light source groups. The processor 510 may perform an operation to calculate a slope for each predetermined unit region within the boundary surface of the object 750 included in the second image. The processor 510 may calculate one or more unit regions by dividing the boundary surface of the object 750 included in the second image into grid-like regions having an arbitrary size. The processor 510 may identify a light source group that has emitted the corresponding light beam, based on the amount of the light beam included in each unit region and the wavelength of the light beam. The processor 510 may identify the light source group that has emitted the light beam reaching a specific unit region by using the amount of the light beam and the wavelength of the light beam included in the specific unit region in the second image acquired through the camera 200. Hereinafter, descriptions will be made with reference to FIG. 7 again. For example, when the first light source group 310 irradiates red light beams to the substrate, the processor 510 may detect a portion in the second image (i.e., the 2-1 image) in which the amount of the red light beam is present. The processor 510 may determine the region marked in red in the 2-1 image as a region that reflects the light beams irradiated from the first light source group 310 to the camera 200 in the boundary surface of the object 750. In this case, the region that reflects the light beams irradiated from the first light source group 310 to the camera 200 in the boundary surface of the object 750 may be a region having a predetermined slope range. In addition, the region that reflects the light beams irradiated from the first light source group 310 to the camera 200 in the boundary surface of the object 750 may have a smaller slope than the region that reflects the light beams irradiated from the second light source group 331 or the third light source group 333 to the camera 200. As another example, when the third light source group 333 irradiates blue light beams to the substrate, the processor 510 may detect a portion in the second image (i.e., the 2-3 image) in which the amount of blue light is present. The processor 510 may determine a region marked in blue in the 2-3 image as a region that reflects the light beams irradiated from the third light source group 333 to the camera 200 in the boundary surface of the object 750. In this case, the region that reflects the light beams irradiated from the third light source group 333 to the camera 200 in the boundary surface of the object 750 may be a region having a predetermined slope range. In addition, the region that reflects the light beams irradiated from the third light source group 333 to the camera 200 in the boundary surface of the object 750 may have a larger slope than the region that reflects the light beams irradiated from the first light source group 310 or the second light source group 331 to the camera 200. Accordingly, the processor 510 may calculate a slope of each unit region in the boundary surface based on the above-described calculation, and consequently may acquire one or more slope regions including one or more unit regions in the boundary surface of the object 750 and having a slope within a predetermined range.

In one embodiment of the present disclosure, the processor 510 may control the first light source group 310 so that the first light source group 310 can irradiate light beams to the boundary surface of the object 750. The irradiated light beams are reflected or refracted at the boundary surface of the object 750, and the camera 200 may capture the reflected or refracted light beams to acquire a second image (i.e., a 2-1 image). In this case, due to the relative positional relationship of the first light source group 310 with respect to the camera 200 and the object 750, only the light beams irradiated from the first light source group 310 and reflected or refracted in a region (hereinafter referred to as a "first slope region") having a relatively small slope range in the boundary surface of the object 750 may reach the camera 200. The slope range that specifies the first slope region may be set in advance according to the intent of an implementer. For example, the first slope region may be a region in the boundary surface of the object 750 in which the slope with respect to the substrate is 0° or more and 10° or less.

Further, the processor 510 may control the second light source group 331 and the camera 200 so that the second light source group 331 can irradiate light beams to the boundary surface of the object 750. The irradiated light beams are reflected or refracted at the boundary surface of the object 750, and the camera 200 may capture the reflected or refracted light beams to acquire a second image (i.e., a 2-2 image). In this case, due to the relative positional relationship of the second light source group 331 with respect to the camera 200 and the object 750, only the light beams irradiated from the second light source group 331 and reflected or refracted in a region (hereinafter referred to as a "second slope region") having a substantially middle slope range in the boundary surface of the object 750 may reach the camera 200. The slope range that specifies the second slope region may be set in advance according to the intent of an implementer. For example, the second slope region may be a region in the boundary surface of the object 750 in which the slope with respect to the substrate is more than 10° and less than or equal to 30°.

Further, the processor 510 may control the third light source group 333 and the camera 200 so that the third light source group 333 can irradiate light beams to the boundary surface of the object 750. The irradiated light beams are reflected or refracted at the boundary surface of the object 750, and the camera 200 may capture the reflected or refracted light beams to acquire a second image (i.e., a 2-3 image). In this case, due to the relative positional relationship of the third light source group 333 with respect to the camera 200 and the object 750, only the light beams irradiated from the third light source group 333 and reflected or refracted in a region (hereinafter referred to as a "third slope region") having a relatively large slope range in the boundary surface of the object 750 may reach the camera 200. The slope range that specifies the third slope region may be set in advance according to the intent of an implementer. For example, the third slope region may be a region in the boundary surface of the object 750 in which the slope with respect to the substrate is more than 30° and less than or equal to 90°.

In a third embodiment of the present disclosure for determining the coating state of an object, the inspection apparatus 10 may detect one slope region in the boundary surface of the object based on the acquired second image, and may determine the coating state of the object 750 based on the one slope region thus detected. Hereinafter, for the sake of convenience, descriptions will be made based on the first slope region. The first slope region in the boundary surface of the object 750 may have a slope substantially equal to or similar to the slope of the substrate surface. In the first slope region, more light beams may be reflected to the camera as the angle of incidence of the light beams irradiated by the light source group is closer to being perpendicular to the substrate surface (i.e., closer to 0 with respect to the vertical axis of the substrate plane). Therefore, in the image (e.g., the 2-1 image) acquired by the light source group (e.g., the first light source group 310) that irradiates light beams nearly perpendicular to the substrate surface, the amount of light beams in the first slope region is relatively large. Conversely, in the image (e.g., the 2-3 image) acquired by the light source group (e.g., the third light source group 333) that irradiates light beams at an angle nearly horizontal to the substrate surface, the amount of light beams in the first slope region is relatively small. The processor 510 may determine the first slope region (i.e., the region having a relatively gentle slope) in the boundary surfaces of the object 750 based on the change in the amount of light beams in the acquired second images (2-1 to 2-3 images). Accordingly, the processor 510 may obtain information indicating the boundary surface of the first slope region (hereinafter referred to as "boundary surface information").

When the object 750 is coated on the metal portion 730 on the substrate, it may spread along the shape of the metal portion 730. In this case, the object covering the upper surface of the metal portion 730 may have a relatively gentle slope. Accordingly, the region having a gentle slope (e.g., the first slope region) determined by the above-described method may correspond to the region of the object covering the metal portion 730. Whether the object sufficiently covers the metal portion 730 may be determined by comparing the determined boundary surface of the corresponding region with the area of the metal portion 730.

Specifically, the processor 510 may acquire information about the metal portion 730. The information about the metal portion 730 may indicate information about the area, location, shape, and the like of the metal portion 730. The processor 510 may determine whether the coated object 750 includes the metal portion 730, based on the previously acquired information about the boundary surface of the first slope region and the information about the metal portion 730. Specifically, the processor 510 may calculate one or more finite planes formed by the information about the boundary surface of the first slope region in the acquired image, and may determine whether the metal portion 730 is included in the finite planes. The processor 510 may determine one or more closed curves from the information about the boundary surface of the first slope region. The processor 510 may calculate finite planes based on the determined closed curves. For example, the processor 510 may determine the outermost edge existing on the outermost side in the boundary surface included in the information about the boundary surface of the first slope region as a closed curve. The processor 510 may calculate the inner region of the closed curve determined based on the outermost edge as a finite plane. The processor 510 may determine whether the metal portion 730 is included in the finite plane calculated based on the outermost edge. Further, the processor 510 may determine the innermost edge existing on the innermost side in boundary surface included in the information about the boundary surface of the first slope region as a closed curve. The processor 510 may calculate the inner region of the closed curve determined based on the innermost edge as a finite plane. The processor 510 may determine whether the metal portion 730 is included in the finite plane calculated based on the innermost edge.

The processor 510 may determine the coating state based on whether the coated object 750 includes the metal portion 730. For example, when one or more metal portions 730 to be coated with an object are included in the substrate, the processor 510 may determine the coating state based on the number of the metal portions 730 included in the coated object 750. That is, when the number of metal portions 730 to be coated is, for example, 100, the processor 510 may determine the coating state by giving different result values to a case where the number of the metal portions 730 included in the coated object 750 is 90 or more, a case where the number of the metal portions 730 included in the coated object 750 is 80 or more, and a case where the number of the metal portions 730 included in the coated object 750 is 50 or more.

In a fourth embodiment of the present disclosure for determining the coating state of an object, the inspection apparatus 10 may detect a plurality of slope regions in the boundary surface of the object based on the acquired second image, and may determine the coating state of the object based on the plurality of slope regions thus detected. The inspection apparatus 10 may determine the coating state of the object by acquiring a second image through the irradiation of a plurality of light beams having different incident angles to the substrate 710 on which the object 750 is coated, and detecting a plurality of slope regions from the boundary surface of the object 750 included in the second image. In the fourth embodiment for determining the coating state of an object, the inspection apparatus 10 may control the first light source group and the second light source group included in the one or more light source groups to irradiate light beams to the substrate, and may control the camera to acquire a second image. In this case, the first light source group and the second light source group may be configured to irradiate light beams having different wavelengths at different incident angles to the substrate on which the object is coated. For the sake of convenience of explanation, it is assumed that, in FIG. 7, reference number 310 denotes a first light source group and reference number 331 denotes a second light source group. That is, it is assumed that the incident angle of the light beam irradiated by the first light source group with respect to the vertical axis of the substrate plane is larger than the incident angle of the light beam irradiated by the second light source group. Further, it is assumed that the first light source group irradiates a red light beam and the second light source group irradiates a blue light beam. The incident angles, positions, or wavelengths of the irradiated light beams of the respective light source groups are merely examples for explanation and do not limit the present disclosure. Under this assumption, the object 750 coated on the substrate may be a viscous fluid, and may spread over the substrate 710 with a gentle slope as it moves away from the boundary of the metal portion 730. In this case, the inside of a region (i.e., first reference distance region) defined by a line formed by a plurality of points spaced apart from the centers of the individual metal portions 730 by a predetermined first reference distance in the boundary surface of the object 750 coated on the substrate may reflect the light beam irradiated from the first light source group 310 toward the camera 200 and may be indicated in red in the second image. In addition, the inside of a region (i.e., second reference distance region) defined by a line formed by a plurality of points spaced apart from the centers of the individual metal portions 730 by a predetermined second reference distance in the boundary surface of the object 750 coated on the substrate and the outside of the first reference distance region may reflect the light beam irradiated from the second light source group 331 toward the camera 200 and may be indicated in blue in the second image. The first reference distance may be preset to a value smaller than the second reference distance. In this regard, the color difference for each region in the second image may be caused by the difference between the slope of the boundary surface of the object existing from the center of the metal portion 730 to the first reference distance and the slope of the boundary surface of the object existing from the center of the metal portion 730 to the first reference distance or more and the second reference distance or less. Accordingly, when the object 750 is coated on the substrate so as to include the metal portion 730 of the substrate 710, the processor 510 may display, in blue, the inside the first reference distance region calculated by the center of the metal portion 730 and the first reference distance in the acquired second image, and may display, in red, the outside of the first reference distance region and the inside of the second reference distance region calculated by the center of the metal portion 730 and the second reference distance in the acquired second image. The inspection apparatus 10 according to the above-described embodiments of the present disclosure can not only detect the boundary surface of the object 750 by using a single light source group, but also can accurately determine the coating state by checking the change in the slope of the boundary surface of the object 750 using a plurality of light source groups. For example, when the object 750 is normally coated on the metal portion 730 under the same assumption as described above, the color of the edge of the object 750 in the second image should be changed from blue to red as the distance from the center of the metal portion 730 increases. On the other hand, when the boundary surface of the object 750 is detected and the color of the edge of the object 750 in the second image is changed conversely or not changed as the distance from the center of the metal portion 730 increases, the coating state may not be good. As such, the inspection apparatus 10 of the present disclosure may determine whether the object includes the metal portion by determining whether the slope of the boundary surface of the object decreases as the distance from the metal part grows small based on the physical properties (e.g., the viscosity, the surface tension, etc.) of the object to be coated, and may consequently determine the coating state of the object.

The description of the fourth embodiment described above is an exemplary description for explanation and does not limit the present disclosure. The present disclosure includes, without limitation, various embodiments for detecting a plurality of slope regions in the boundary surface of the object and determining the coating state of the object based on the detected slope regions. For example, the value that serves as a basis for determining a predetermined reference distance region may be the edge of the metal portion instead of the center of the metal portion. In this case, even if the metal portion has a non-circular shape, it is possible to determine a predetermined reference distance region. In addition, two or more reference distances measured from the center of the metal portion can be freely set. In this case, a change in slope of the boundary surface of the object can be measured in more detail.

In one embodiment of the present disclosure, the type of the wavelength band of the light beam of each of the one or more light source groups or the composition and combination of wavelength bands of the light beams for a plurality of light source groups may be determined according to a predetermined experimental result. The type of the wavelength band of the light beam of each of the one or more light source groups or the composition and combination of wavelength bands of the light beams for a plurality of light source groups may be determined so that, for example, the "value difference" (contrast) between two images acquired before and after the object is coated on the substrate increases. In this regard, the image may be an original image captured and acquired by the camera, or may be a composite image generated from at least one original image captured and acquired by the camera. The composite image may be acquired by, for example, an operation of converting an image from an RGB coordinate system to an HIS coordinate system, an operation of converting a single scale image to a multi scale image, a scaling operation of adjusting a range of values, an operation of adjusting the size of values, or an arithmetic operation with two or more images used as input.

FIG. 8 is a flowchart illustrating an operation of the inspection apparatus according to one embodiment of the present disclosure. In operation S810, the inspection apparatus 10 according to one embodiment of the present disclosure may acquire one or more first images stored in one or more memories. Each of the one or more first images may be acquired by capturing, through a camera, a light beam irradiated from each of the one or more light source groups to a substrate on which an object is not coated, and reflected by the substrate. The one or more light source groups may be configured to irradiate light beams to a substrate on which the object is coated, at different predetermined incident angles. Each of the one or more light source groups may include a plurality of light sources arranged on imaginary concentric circles parallel to the substrate on which the object is coated. Each of the one or more light source groups may irradiate at least one selected from the group consisting of a red light beam, a green light beam, a blue light beam, an ultraviolet light beam and an infrared light beam to the substrate on which the object is coated. The camera for image acquisition may be disposed vertically above the substrate on which the object is coated.

In operation S820, the inspection apparatus 10 according to one embodiment of the present disclosure may irradiate light beams to the substrate on which the object is coated, by controlling the first light source group among the one or more light source groups. The object may include an adhesive material, and may be, for example, a flux. In operation S830, the inspection apparatus 10 may capture the light beams reflected by the substrate on which the object is coated, and acquire a second image by controlling the camera. In operation S840, the inspection apparatus 10 may determine the coating state of the object based on one or more first images and one or more second images. In one embodiment, the inspection apparatus 10 may determine the coating state of the object based on the amount of change in brightness between the first images acquired by the first light source group among the one or more first images and the second images.

FIG. 9 is a flowchart illustrating an operation of the inspection apparatus according to one embodiment of the present disclosure. In operation S910, the inspection apparatus 10 according to an embodiment of the present disclosure may acquire one or more first images stored in one or more memories. Operation S910 in FIG. 9 may be performed in a manner identical or similar to operation S810 in FIG. 8, and descriptions of duplicated contents are omitted below. In operation S920, the inspection apparatus 10 may control the first light source group among the one or more light source groups and the camera to irradiate light beams to the substrate on which the object is coated, and acquire a 2-1 image. The second light source group may be a light source group that irradiates light beams having a different wavelength from that of the first light source group to the substrate at different incident angles. In operation S930, the inspection apparatus 10 may control the second light source group among the one or more light source groups and the camera to irradiate light beams to the substrate on which the object is coated, and acquire a 2-2 image.

In operation S940, the inspection apparatus 10 according to one embodiment of the present disclosure may determine a first brightness difference between the first image (i.e., "1-1 image") acquired by the first light source group among the one or more first images and the first image (i.e., "1-2 image") acquired by the second light source group among the one or more first images. The 1-1 image and the 1-2 image may be pre-stored in one or more memories. In operation S950, the inspection apparatus 10 may determine a second brightness difference between the 2-1 image acquired by the first light source group and the 2-2 image acquired by the second light source group. The difference in brightness between the two images may be calculated for a predetermined region or for each pixel. In operation S960, the inspection apparatus 10 may determine the coating state of the object based on the change amounts of the first and second brightness differences thus determined. For example, the inspection apparatus 10 may determine the coating state of the object by comparing the amount of change between the first brightness difference and the second brightness difference with a predetermined reference value.

Although the respective steps of the method or algorithm according to the present disclosure have been described in a sequential order in the illustrated flowchart, the respective steps may be performed in an order that can be arbitrarily combined by the present disclosure, in addition to being performed sequentially. The description in accordance with this flowchart does not exclude making changes or modifications to the method or algorithm, and does not imply that any step is necessary or desirable. In one embodiment, at least some of the steps may be performed in parallel, repetitively or heuristically. In one embodiment, at least some of the steps may be omitted, or other steps may be added.

Various embodiments of the present disclosure may be implemented as software recorded on a machine-readable recording medium. The software may be software for implementing the various embodiments of the present disclosure described above. The software may be inferred from various embodiments of the present disclosure by programmers in the art to which the present disclosure belongs. For example, the software may be instructions (e.g., code or code segments) or programs that can be read by a device. The device is a device capable of operating according to instructions called from a recording medium, and may be, for example, a computer. In one embodiment, the device may be the computing device 100 according to embodiments of the present disclosure. In one embodiment, the processor of the device may execute the called instructions so that components of the device can perform a function corresponding to the instructions. In one embodiment, the processor may be the processors 510 according to the embodiments of the present disclosure. The recording medium may refer to any type of device-readable recording medium in which data is stored. The recording medium may include, for example, a ROM, a RAM, a CD-ROM, a magnetic tape, a floppy disk, an optical data storage device, and the like. In one embodiment, the recording medium may be a memory 520. In one embodiment, the recording medium may be implemented in a distributed form in computer systems connected by a network. The software may be distributed, stored and executed in a computer system or the like. The recording medium may be a non-transitory recording medium. The non-transitory recording medium refers to a tangible medium irrespective of whether data is stored semi-permanently or temporarily, and does not include a signal propagating in a transitory manner.

Although the technical content of the present disclosure has been described by the examples described in some embodiments and illustrated in the accompanying drawings, it should be noted that various substitutions, modifications, and changes can be made without departing from the scope of the present disclosure which can be understood by those having ordinary skill in the art to which the present disclosure pertains. In addition, it should be noted that such substitutions, modifications, and changes are intended to fall within the scope of the appended claims.

What is claimed is:

1. An apparatus, comprising:
   one or more light source groups;
   a camera;
   one or more memories configured to store one or more first images acquired in advance; and
   one or more processors communicatively connected to the one or more light source groups, the camera, and the one or more memories,
   wherein each of the one or more first images acquired by capturing, with the camera, light beams irradiated from the one or more light source groups and reflected by a substrate on which an object is not coated, and
   wherein the one or more processors are configured to:
   acquire one or more second images by controlling a first light source group or a second light source group among the one or more light source groups and the camera and irradiating light beams to the substrate on which the object is coated,
   determine a first brightness difference between two first images among the one or more first images, a first image of the two first images being acquired using the first light source group and another first image of the two first images being acquired using the second light source group,
   determine a second brightness difference between two second images among the one or more second images, a second image of the two second images being acquired based on the first light source group and another second image of the two second images being acquired based on the second light source group, and
   determine a coating state of the object based on an amount of change between the first brightness difference and the second brightness difference.

2. The apparatus of claim 1, wherein the object includes an adhesive material.

3. The apparatus of claim 1, wherein each of the one or more light source groups is configured to irradiate light beams to the substrate on which the object is coated, at different predetermined incident angles.

4. The apparatus of claim 1, wherein each of the one or more light source groups includes a plurality of light sources arranged on imaginary concentric circles parallel to the substrate on which the object is coated, and the camera is disposed vertically above the substrate on which the object is coated.

5. The apparatus of claim 1, wherein each of the one or more light source groups is configured to irradiate at least one selected from a red light beam, a green light beam, a blue light beam, an ultraviolet light beam, and an infrared light beam to the substrate on which the object is coated.

6. The apparatus of claim 1, wherein the one or more processors are configured to determine the coating state of the object based on an amount of change in brightness between the first image acquired by the first light source group among the one or more first images and the one or more second images.

7. The apparatus of claim 1, wherein the one or more processors are configured to detect a boundary surface of the object based on the one or more second images, and determine the coating state of the object based on the boundary surface.

8. The apparatus of claim 7, wherein the one or more processors are configured to acquire the one or more second images by additionally controlling the second light source group included in the one or more light source groups, and the first light source group and the second light source group are configured to irradiate light beams having different wavelengths at different incident angles to the substrate on which the object is coated.

9. A method, comprising:
  acquiring, by one or more processors, one or more first images stored in one or more memories;
  controlling, by the one or more processors, a first light source group or a second light source group among the one or more light source groups to irradiate light beams to a substrate on which an object is coated;
  controlling, by the one or more processors, a camera to capture the light beams reflected by the substrate on which the object is coated and acquire one or more second images;
  determining, by the one or more processors, a first brightness difference between two first images among the one or more first images, a first image of the two first images being acquired using the first light source group and another first image of the two first images being acquired using the second light source group;
  determining, by the one or more processors, a second brightness difference between two second images among the one or more second images, a second image of the two second images being acquired based on the first light source group and another second image of the two second images being acquired based on the second light source group; and
  determining, by the one or more processors, a coating state of the object based on an amount of change between the first brightness difference and the second brightness difference,
  wherein each of the one or more first images acquired by capturing, with the camera, light beams irradiated from the one or more light source groups and reflected by the substrate on which the object is not coated.

10. The method of claim 9, wherein the object includes an adhesive material.

11. The method of claim 9, wherein each of the one or more light source groups is configured to irradiate light beams to the substrate on which the object is coated, at different predetermined incident angles.

12. The method of claim 9, wherein each of the one or more light source groups includes a plurality of light sources arranged on imaginary concentric circles parallel to the substrate on which the object is coated, and the camera is disposed vertically above the substrate on which the object is coated.

13. The method of claim 9, wherein each of the one or more light source groups is configured to irradiate at least one selected from a red light beam, a green light beam, a blue light beam, an ultraviolet light beam, and an infrared light beam to the substrate on which the object is coated.

14. The method of claim 9, further comprising:
  determining, by the one or more processors, the coating state of the object based on the amount of change in brightness between the first image acquired by the first light source group among the one or more first images and the one or more second images.

15. The method of claim 9, further comprising:
  detecting, by the one or more processors, a boundary surface of the object based on the one or more second images; and
  determining, by the one or more processors, the coating state of the object based on the boundary surface.

16. The method of claim 15, wherein the controlling the camera to capture the light beams reflected by the substrate on which the object is coated and acquire the one or more second images includes additionally controlling, by the one or more processors, the second light source group included in the one or more light source groups, and
  wherein the first light source group and the second light source group are configured to irradiate light beams having different wavelengths at different incident angles to the substrate on which the object is coated.

17. A non-transitory computer-readable recording medium that stores instructions to be executed on a computer, the instructions configured to allow, when executed, one or more processors to:
  acquire one or more first images stored in one or more memories, each of the one or more first images acquired by capturing, with a camera, light beams irradiated from one or more light source groups and reflected by a substrate on which an object is not coated;
  control a first light source group among the one or more light source groups or a second light source group and the camera to irradiate light beams to the substrate on which the object is coated, and acquire one or more second images;
  determine a first brightness difference between two first images among the one or more first images, a first image of the two first images being acquired using the first light source group and another first image of the two first images being acquired using the second light source group;
  determine a second brightness difference between two second images among the one or more second images, a second image of the two second images being acquired based on the first light source group and another second image of the two second images being acquired based on the second light source group; and
  determine a coating state of the object based on an amount of change between the first brightness difference and the second brightness difference.

* * * * *